United States Patent [19]

Cunningham

[11] Patent Number: 4,517,505
[45] Date of Patent: May 14, 1985

[54] VARIBLE FORCE, EDDY-CURRENT OR MAGNETIC DAMPER

[75] Inventor: Robert E. Cunningham, Cleveland, Ohio

[73] Assignee: The United States of America as represented by the Administrator of the National Aeronautics and Space Administration, Washington, D.C.

[21] Appl. No.: 463,456

[22] Filed: Feb. 3, 1983

[51] Int. Cl.³ .............................................. G05B 5/01
[52] U.S. Cl. .................................... 318/611; 310/77; 310/93; 335/100
[58] Field of Search ............................. 318/611–614, 318/460; 310/77, 93, 105–110; 324/125; 335/100

[56] References Cited

U.S. PATENT DOCUMENTS

| 2,353,618 | 7/1944 | Lamb | 324/125 |
| 3,099,094 | 7/1963 | Ehrich et al. | 318/611 X |
| 3,277,357 | 10/1966 | Willis | 310/77 X |
| 3,699,369 | 10/1972 | Hlipala | 310/106 |
| 4,142,610 | 3/1979 | Alexander | 310/77 X |
| 4,390,260 | 6/1983 | Prinz | 318/614 X |
| 4,398,111 | 8/1983 | Zuch | 310/93 |

Primary Examiner—B. Dobeck
Attorney, Agent, or Firm—Norman T. Musial; John R. Manning; James A. Mackin

[57] ABSTRACT

An object of the invention is to provide variable damping for resonant vibrations which may occur at different rotational speeds in the range of rpms in which a rotating machine is operated.

A variable force damper in accordance with the invention includes a rotating mass (12) carried on a shaft (11) which is supported by a bearing (13) in a resilient cage (14). Cage (14) is attached to a support plate (15) whose rim extends into an annular groove in a housing (17).

Variable damping is effected by tabs (18) of electrically conducting, non-magnetic material which extend radially from the cage (14). The tabs (18) at an index position lie between the pole faces of respective C-shaped magnets (19). The magnets (19) are attached by cantilever spring members (20) to the housing (17).

By rotating the support plate (15) about the axis of shaft (11), the tabs (18) may be rotated through an angle 0 of about 40° away from the index or 0° position. At the 40° position minimum damping is obtained.

To position support plate (15) to achieve a desired amount of damping, means for generating an electrical signal indicative of the vibrating displacement of shaft (11) such as displacement detector (29) and correction module (28) to control a servo (27). The servo (27) can drive the support plate (15) through various means such as gears, drive wheels or the like.

12 Claims, 2 Drawing Figures

VARIBLE FORCE, EDDY-CURRENT OR MAGNETIC DAMPER

ORIGIN OF THE INVENTION

The invention described herein was made by an employee of the United States Government and may be manufactured or used by or for the Government for governmental purposes without the payment of any royalties thereon or therefor.

DESCRIPTION

1. Technical Field

The invention relates to high speed rotating machinery and is directed more particularly to damping apparatus for reducing resonant vibrations of the rotating parts.

With any rotating machinery there is one or more rotating speeds at which the rotating body will develop resonant vibrations. These vibrations cause stress on support bearings and the shaft supporting the rotating mass and will cause early destruction of these components. Examples of high speed, turbomachinery are the fuel and oxidizer pumps used on the main engines of a NASA space shuttle. These pumps are used for liquid oxygen and liquid hydrogen. Such machines have very high power to weight ratios and are required to operate at rotor speeds of up to 36,000 rpm.

In accelerating up to operating speed, it is common to encounter one or more system resonant frequencies. A capability of varying the stiffness and damping of shaft bearing supports while operating through such resonant frequencies is an important goal. Having this capability can reduce the magnitude of the forces transmitted to the bearings and seals and can, therefore, prolong their life or possibly prevent sudden and catastrophic failure.

2. Background Art

In the prior art damping of rotating machinery has been attempted by a number of different devices. In one such device, the shaft bearings are supported in resilient materials or by springs having predetermined spring rates.

In turbomachines such as turbojet engines, radial and axial compressors, and high speed gas liquefiers, fluid film dampers are often used. These dampers employ a viscous fluid film between moving parts. Vibrational energy induced in the rotor and transmitted to the bearing supports is dissipated as heat in shearing the viscous fluid.

The so-called squeeze film damper dissipates energy by pumping a viscous fluid in and out of a narrow annulus. The amount of damping and stiffness is determined by the original design and expected amplitudes of vibration. The squeeze film type dampers normally must be located very close to a bearing where lubricating oils are available in large quantities, thus creating a design problem.

Another type of damper commonly used is a friction or coulomb damper. In this type damper the energy dissipated is dependent on the coefficient of friction of two contacting surfaces under applied pressure. The problem here is to predict the amount of damping and stiffness available for any given vibrational situation. If the contacting surfaces are under too little pressure, slip relative to one another may produce erratic amounts of damping. Conversely, if the pressure is too great, the contacting surfaces may have little, if any, slip resulting in high stiffness values and little, if any, damping.

U.S. Pat. No. 3,316,661 to Simpson et al discloses an eddy current brake in which a movable shield or shunt is interposed between a magnet and a rotating conductor. The shunt may be moved through the gap between the magnet and the rotating conductor to shield variable portions of the conductor from the magnetic field to alter the area and shape of the magnetic field penetrating the disc.

U.S. Pat. No. 3,601,641 to Baermann discloses an eddy current and/or induction break or clutch comprised of a breaking inductor and a ferromagnetic eddy current conductor arranged for relative rotation with respect to one another. The magnetic field produced by the permanent magnet 38 can be increased or decreased by the electromagnetic field produced by a field winding. Breaking torque can be adjusted by changing the energizing field of the AC generator which feeds the windings.

U.S. Pat. No. 4,198,863 to Bartek discloses an electromagnetic torsion stiffness arrangement having a conductor located on a disc rotating in an air gap between magnetic systems. The disc also serves to dampen the rotary motion.

U.S. Pat. No. 3,510,705 to O'Neill et al discloses a magnetic hysteresis device having a magnetic hysteresis member and at least one magnetizing head supported for relative movement in such a way that energy is dissipated within the member by magnetic hysteresis to produce a hysteresis drag force opposing the relative movement. The hysteresis drag force may be varied in accordance with a predetermined function of the relative displacement of the member and head.

U.S. Pat. No. 3,637,169 to Tossman et al discloses a pendulum having a vane member formed of electrically conductive, nonmagnetic material which swings between pole faces of a magnetic structure and creates eddy current losses within the vane member to dissipate coulombic energy.

U.S. Pat. No. 4,200,003 to Miller discloses a rotary disc damper using magnetic fluid as the damping medium. The damper comprises a permanent magnet rotor enclosed in a magnetically permeable housing. The housing contains a magnetic fluid which is held in place by the magnetic forces generated by the magnet rotor. The torque of the damper may be varied by changing the viscosity of the magnetic fluid or the level of the magnetic flux in the magnetic circuit.

DISCLOSURE OF THE INVENTION

According to the invention, one end of a shaft carrying a rotating mass is supported by a suitable bearing which, in turn, is supported resiliently in a cage member. The cage member is attached to a plate which may be rotated to position electrically conductive, non-magnetic tabs which extend radially from the cage member.

At an index position of the support plate each tab lies within the pole faces of a respective C-shaped magnet. Each magnet is supported by a cantilever spring from a housing in which the support plate is free to rotate.

Maximum damping of shaft vibrations is achieved when the tabs are positioned within the pole faces of their respective magnets. By rotating the support plate, the cage member with the attached tabs can be rotated through an angle of approximately 40° to achieve minimum damping effect.

Electronic circuitry may be provided to measure the displacement or speed of the rotating shaft. A signal representative of these parameters may be modified and amplified to drive a servo which rotates the support plate to a position which will achieve the desired damping for a particular frequency or speed of rotation.

DESCRIPTION OF A PREFERRED EMBODIMENT

Figure 1:
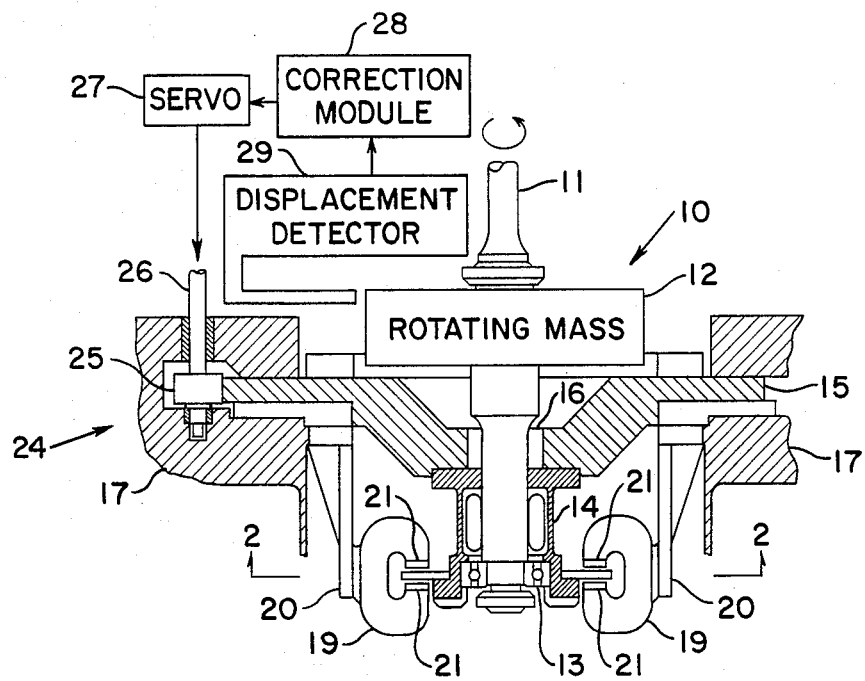
FIG. 1 is a transverse cross-sectional view of a variable force, eddy current or magnetic damper embodying the invention.

Referring now to FIG. 1, there is shown a variable force, eddycurrent damper 10 constructed in accordance with the invention. A shaft 11 carries a mass 12 such as a turbine which rotates with the shaft 11.

One end of the shaft 11 is journaled in a bearing 13 which is disposed in one end of a bearing support such as a squirrel cage spring 14. The other end of the squirrel cage spring 14 is attached to the center of a bearing support carrier plate 15 which has a circular rim.

The shaft 11 extends through an aperture 16 in the spring carrier 15 and coaxially through the squirrel cage spring 14. Spring carrier plate 15 is rotatably supported by an annular groove in a housing 17 in which the eddy current damper 10 is disposed.

To the end that resonant vibrations of the shaft 11 and rotating mass 12 will be adequately damped, tabs 18 of highly electrically conductive, non-magnetic material are attached to and extend radially from the squirrel cage spring 14 adjacent the bearing 13. When the spring carrier 15 is at 0° index position, as will be described presently with regarding to FIG. 2, each tab 18 is positioned between the poles of a respective C-shaped magnet 19.

Each C-shaped magnet 19 is supported by a cantilever spring 20 from the housing 17. The C-shaped magnets 19 are provided with rare earth magnetic pole faces 21 to increase the magnetic strength applied to the tabs 18.

Figure 2:
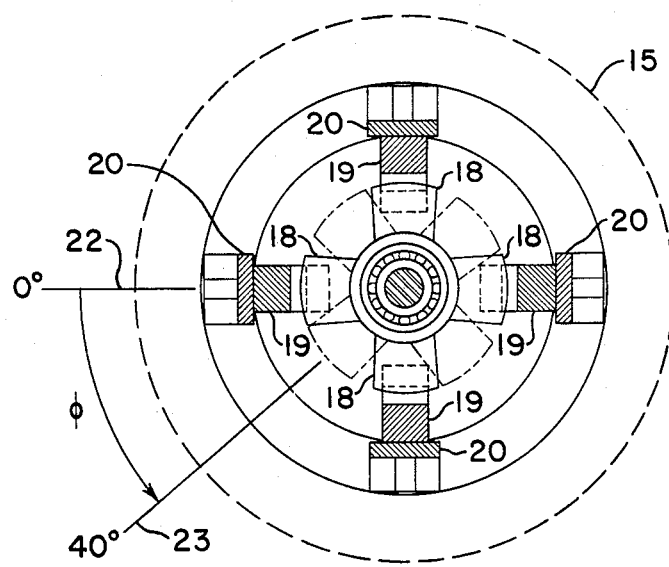
FIG. 2 is a cross-sectional view taken along the lines 2—2 of FIG. 1.

Referring now to FIG. 2, there is shown a transverse sectional view taken along the line 2—2 of FIG. 1. The tab 18 on the left as viewed in FIG. 2 is aligned with line 22 at a 0° index position when it is in maximum surface-to-surface confrontation between the pole faces of its respective C-shaped magnet 19.

Similarly, at the 0° position of spring carrier 15, all of the remaining tabs will be positioned between the pole faces of their respective C-shaped magnets 19. At the 0° position of the spring carrier 15, maximum damping effect is obtained. By rotating the spring carrier 15 through an angle $\phi$ of 40° to a position, as indicated by line 23, substantially zero damping is effected.

In order to rotate the spring carrier 15 to a desired position or angle $\phi$ whereby the tabs 18 are positioned as desired, a tab positioner 24 is provided as illustrated in FIG. 1. Tab positioner 24 includes a wheel or gear 25 carried on a shaft 26. The wheel 25 engages the rim of the spring carrier plate 15 so that by rotating the shaft 26 some predetermined number of turns, plate 15 will be rotated, thereby positioning the tabs 18 as desired.

In order that the spring carrier may be automatically rotated to a prescribed damping position, shaft 26 of the tab positioner 24 may be rotated by a servo 27. Servo 27 is supplied with a correction signal from a correction module 28 in response to radial movement of the rotating mass 12 as measured by a displacement detector 29.

Displacement detector 29 may be any one of well known types operating on capacitive, inductive or light beam principles. The signal generated by the displacement detector 29 is related to the radial displacement of the rotating mass 12 and after being amplified and/or modified by the correction module 28, drives the servo 27.

Rotation of the carrier plate 15 can also be accomplished by directing to the servo 27 a signal related to the rotating speed (rpm) of the mass 12 so that at certain rpms plate 15 rotates to place the tabs 18 at predetermined positions. These positions may be determined empirically by rotating mass 12 at various speeds and determining the rpm's at which unacceptable resonant vibrations occur. Plate 15 is then rotated to provide maximum damping for each particular rpm at which the resonant vibrations occur. When these factors are known, an rpm counter for the mass 12 can signal servo 27 to adjust the plate 15 for maximum damping.

As discussed previously, one particular application of the above-described invention is in pumps operating in cryogenic environments such as liquid hydrogen. Advantageously, cryogenic temperatures increase the conductivity of the tabs 18 and, consequently, increase the damping effectiveness of the eddy current shaft damper described above. Tests have shown that the damping provided when tabs 18 are aluminum and the apparatus is immersed in liquid nitrogen is seven times greater than when the tabs 18 are at room temperature.

Theoretically, if tabs 18 are copper the damping effect should be 11 times greater in liquid nitrogen than at room temperature. With a low purity copper material, however, the damping in liquid nitrogen was only $2\frac{1}{2}$ times as great as at room temperature. With all conditions being the same, copper, because of its high conductivity, has greater damping effect than aluminum.

While the variable force damper shown in FIG. 2 utilizes permanent magnet 20, it will be understood that electromagnets can also be used. Also, while four tabs 18 are shown, three tabs with associated magnets may be used as well as five or more tabs with associated magnets. Of course, less damping is effected with three tabs while more than four tabs add to the weight and complexity of the damping apparatus without proportionately increasing the damping effect.

It will be understood that changes and modifications may be made to the above-described invention without departing from its spirit and scope as set forth in the claims appended hereto.

I claim:

1. A variable damper for substantially eliminating resonant vibrations in a rotating mass carried on a shaft in a housing and wherein the shaft is provided with at least one bearing, said damper comprising:

a resilient support for said bearing, said support being rotatable about the axis of rotation of said shaft;

a carrier plate for said bearing support comprising a rotatable plate, said bearing support being attached to said carrier plate for rotation therewith;

a plurality of tabs extending radially from said bearing support, said tabs being of electrically conductive, non-magnetic material;

a plurality of magnets equal in number to said plurality of tabs, each magnet having at least one pole face in non-contacting, maximum surface-to-surface confrontation with a respective tab when said plate is in a 0° index position; and means for rotating said carrier plate whereby said tabs may be positioned from the 0° index position to one in which there is minimum surface-to-surface confrontation between the tabs and respective magnets.

2. The damper of claim 1 wherein a cryogenic liquid is applied to said tabs and magnets.

3. The damper of claim 1 wherein said bearing support is a squirrel cage spring.

4. The damper of claim 1 wherein said magnets are C-shaped with each tab lying between the poles of a respective magnet when said carrier is in said 0° index position.

5. The damper of claim 4 wherein each pole of the C-shaped magnets is provided with a rare earth metal pole face.

6. The damper of claim 1 wherein each magnet is resiliently supported on said housing.

7. The damper of claim 1 and including an adjusting shaft carrying a drive wheel engaging said carrier plate to rotate the same, when said shaft is turned.

8. The damper of claim 7 and including:

means for generating a first electrical signal indicative of radial displacement of said rotating mass;

servo means drivingly connected to said adjusting shaft; and means for adjusting said first electrical signal and directing it to said servo whereby said carrier plate is rotated to a prescribed position in accordance with the resonant vibrations of said rotating mass.

9. The damper of claim 1 wherein said tabs are of a material selected from the group of metals comprising copper and aluminum.

10. The damper of claim 1 wherein said magnets are electromagnets with a predetermined, constant field strength.

11. The damper of claim 1 and including:

first means for generating an electrical signal related to the rotational speed of said rotating mass;

second means for rotating said carrier plate between a 0° index position which provides maximum damping and a position which provides minimum damping, and;

third means for transmitting said signal from said first means to said second means whereby said carrier plate is automatically positioned to provide predetermined damping at a plurality of specific rotational speeds of said rotating mass.

12. The damper of claim 11 wherein said second means comprises a servo driving a wheel which engages a rim portion of said carrier plate.

* * * * *